United States Patent Office 2,971,953
Patented Feb. 14, 1961

2,971,953
WATER-INSOLUBLE AZO-DYESTUFFS

Paul Rhyner, Basel, Switzerland, assignor to Ciba Limited, Basel, Switzerland

No Drawing. Filed Dec. 2, 1958, Ser. No. 777,582
Claims priority, application Switzerland Dec. 11, 1957

6 Claims. (Cl. 260—207.1)

This invention provides valuable new water-insoluble azo-dyestuffs which are free from acid groups impairing solubility in water and correspond to the general formula:

$$A-N=N-B$$

in which A represents the radical of a diazo-component of the benzene series, and B represents a benzene radical containing in para-position to the azo-linkage an amino group in which one of the hydrogen atoms is replaced by a cyanethyl group and the other hydrogen atom by an alkyl group which may be substituted, and which benzene radical contains an aliphatic acylamino group in meta-position to the said amino group.

The invention also provides a process for the manufacture of the monazo-dyestuffs of the above general formula, wherein a diazotized amine of the benzene series is coupled with a monamine of the benzene series capable of coupling in para-position to the amino group and in the amino group of which one hydrogen atom is replaced by a cyanalkyl group and the other hydrogen atom by an alkyl group which may be substituted, and which contains in meta-position to the said amino group an aliphatic acylamino group, the said components being free from acid groups imparting solubility in water.

Of special interest are diazo-components of the formula:

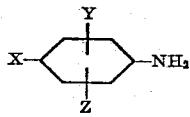

in which X, Y and Z each represent a hydrogen atom or halogen atom or an alkyl, alkoxy, nitro, cyano, or alkyl-sulfone group. The term "alkyl-sulfone group" includes such groups substituted in the alkyl group such, for example, as chloromethyl-sulfone or β-cyanethyl-sulfone groups.

As examples of suitable diazo-components there may be mentioned the following amines:

1-amino-4-methylbenzene,
1-amino-4-chlorobenzene,
1-amino-4-bromobenzene,
1-amino-4-nitrobenzene,
1-amino-4-cyanobenzene,
1-amino-4-methyl-sulfonyl-benzene,
1-amino-4-carboxylic acid methyl ester,
1-amino-4-chloromethyl-sulfone,
1-amino-4-cyanethyl-sulfone,
1-amino-2:4-dichlorbenzene,
1-amino-2-methyl-4-chlorbenzene,
1-amino-2-trifluoromethyl-4-chlorbenzene,
1-amino-2-cyano-4-chlorbenzene,
1-amino-2-chlor-4-cyanobenzene,
1-amino-2-chlor-4-nitrobenzene,
1-amino-4-chlor-2-methyl-sulfonyl-benzene,
1-amino-2-chlor-4-methyl-sulfonyl-benzene,
1-amino-2-chlor-4-chlormethyl-sulfonyl-benzene,
1-amino-2-chlor-4-cyanethyl-sulfonyl-benzene,
1-amino-2:4-dicyanobenzene,
1-amino-2-cyano-4-methyl-sulfonyl-benzene,
1-amino-4-cyano-2-methyl-sulfonyl-benzene,
1-amino-2:4-bis-(methyl-sulfonyl)-benzene,
1-amino-2:6-dichloro-4-nitrobenzene,
1-amino-2:6-dibromo-4-methyl-sulfonyl-benzene,
1-amino-2-methyl-4-nitrobenzene,
1-amino-2-trifluoromethyl-4-nitrobenzene,
1-amino-2-chlor-4-nitrobenzene,
1-amino-2-cyano-4-nitrobenzene,
1-amino-2-methyl-sulfonyl-4-nitrobenzene,
1-amino-2-chloromethyl-sulfonyl-4-nitrobenzene,
1-amino-2-cyanethylsulfonyl-4-nitrobenzene,
1-amino-2:4-dinitrobenzene,
1-amino-2:4-dinitro-6-chlor-benzene,
1-amino-2:4-dinitro-6-brom-benzene,
1-amino-4-acetylaminobenzene.

As coupling components there may be mentioned more especially amines of the formula:

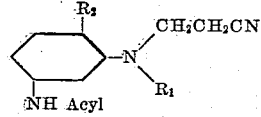

in which "Acyl" represents an aliphatic acyl group containing at most six carbon atoms, $R_1$ represents an alkyl or hydroxy-alkyl group containing at most four carbon atoms, and $R_2$ represents a hydrogen or halogen atom or an alkyl or alkoxy group containing at most four carbon atoms. As suitable acyl groups there may be mentioned more especially those of the formula $-COC_{n-1}H_{2n-1}$, in which $n$ represents a whole number of at most 6. As examples there may be mentioned the radicals of formic acid, acetic acid, propionic acid, butyric acid and isobutyric acid. Finally, there may be mentioned as acyl groups semi-esters of carbonic acid, for example, the radicals of the formulae $-COOCH_3$ and $-COOC_2H_5$.

As examples of coupling components there may be mentioned:

N-ethyl-N-cyanethyl-amino-3-acetylamino-benzene,
N-butyl-N-cyanethyl-amino-3-acetylamino-benzene,
N - hydroxyethyl - N - cyanethyl - amino - 3 - acetylamino-benzene,
N-ethyl-N-cyanethyl-amino-3-propionylamino-benzene,
N-methyl-N-cyanethyl-amino-3-butyrylamino-benzene,
N - ethyl - N - cyanethyl - amino - 3 - propionylamino-6-methylbenzene,
N - ethyl - N - cyanethyl - amino - 3 - propionylamino-6-chlorobenzene,
N - ethyl - N - cyanethyl - amino - 3 - acetylamino - 6-methoxybenzene,
N - β:γ - dihydroxypropyl - N - cyanethyl - amino - 3-carbethoxyamino-benzene.

The aforesaid coupling components can be obtained, for example, by nitrating N-alkyl-N-cyanethyl-benzenes in known manner in concentrated sulfuric acid, followed by reduction of the nitro group in the resulting N-alkyl-N-cyanalkyl-3-nitrobenzenes to the amino group and acylation of the latter group, or by reacting 1-amino-3-nitrobenzene with acrylonitrile to form N-cyanethyl-amino-3-nitrobenzene, reduction of the nitro group in the latter compound to the amino group and acylation of the latter group, whereby the N-cyanethylamino-3-acylaminobenzene is obtained, which is converted by treatment with an alkyl halide, for example, ethylene chlorhydrin, into the N-hydroxyethyl-N-cyanethyl-3-acylaminobenzene. These coupling components can also be obtained by reacting N-acetyl-1:3-diamino-benzene with acrylonitrile to form N-acetyl-N'-β-cyanethyl-diamino-benzene followed by alkylation to the N-acetyl-N'-β-cyanethyl-N'-alkyl-diaminobenzene.

The aforesaid diazo-components may be diazotized by methods in themselves known, for example, with the aid of a mineral acid, especially hydrochloric acid and sodium nitrite, or, for example, with a solution of nitrosyl-sulfuric acid in concentrated sulfuric acid.

The coupling can also be carried out by a method in itself known, for example, in a neutral to acid medium, if desired, in the presence of sodium acetate or like buffer substance influencing the speed of coupling or a catalyst, for example, pyridine or a salt thereof.

After the coupling reaction the dyestuffs formed can easily be separated from the coupling mixtures, for example, by filtration, as the dyestuffs are practically insoluble in water.

The new monoazo-dyestuffs of this invention are excellently suitable for dyeing or printing structures, for example, of polyamides, and especially fibers of cellulose acetate, artificial silk, cellulose triacetate or polyethylene terephthalate.

The dyeings produced with the new dyestuffs on the aforesaid structures are distinguished by the purity and brilliance of their tints and by their good general properties of fastness, especially their high fastness to sublimation and light.

The following examples illustrate the invention, the parts and percentages being by weight.

Example 1

13.8 parts of 1-amino-4-nitrobenzene are dissolved in 30 parts of water and 30 parts of concentrated hydrochloric acid. After the addition of 80 parts of ice, 6.9 parts of sodium nitrite are added and the whole is stirred until the diazo-solution is clear and almost colorless.

The diazo-solution so obtained is run into a solution of 23.1 parts of N-ethyl-N-β-cyanethyl-amino-3-acetyl-aminobenzene in 40 parts of 2 N-hydrochloric acid. The dyestuff is precipitated by the addition of a saturated solution of sodium acetate. Cellulose acetate artificial silk, nylon, cellulose triacetate and polyethylene terephthalate are dyed with the resulting dyestuff red tints which are fast to light and sublimation.

The N-ethyl-N-cyanethylamino-3-acetylamino-benzene used as coupling component can be obtained as follows:

N-ethyl-N-cyanethyl-aminobenzene is nitrated in known manner (see, for example, Organic Syntheses Col., volume 3, page 658 [1955]). In the resulting N-ethyl-N-cyanethyl-amino-3-nitrobenzene, the nitro group is reduced to the amino group by a method in itself known and the amino group is acetylated by an ordinary method.

The coupling components used in the following examples can be obtained in an analogous manner.

Example 2

17.25 parts of 1-amino-2-chloro-4-nitrobenzene are introduced in portions into 60 parts of concentrated sulfuric acid in which 6.9 parts of sodium nitrite have been dissolved. By pouring the mixture on to 400 parts of ice a clear yellow solution is formed. The resulting diazo-solution is added to a solution of 23.1 parts of N-ethyl-N-β-cyanethyl-amino-3-acetylamino-benzene, in 40 parts of 2 N-hydrochloric acid. By the addition of a saturated solution of sodium acetate the dyestuff is precipitated. The dyestuff so obtained dyes cellulose acetate, nylon, cellulose triacetate and polyethylene terephthalate dark red tints that are fast to light.

Example 3

16.3 parts of 1-amino-2-cyano-4-nitrobenzene are diazotized and coupled with 23.1 parts of N-ethyl-N-β-cyanethyl-amino-3-acetyl-amino-benzene in the manner described in Example 2. The resulting dyestuff dyes cellulose acetate, nylon, cellulose, triacetate, and polyethylene terephthalate claret red tints which are fast to light and sublimation.

Example 4

21.6 parts of 1-amino-4-nitrobenzene-2-methyl-sulfone are diazotized and coupled with 23.1 parts of N-ethyl-N-β-cyanethyl-amino-3-acetylamino-benzene and coupled. The resulting dyestuff dyes the aforesaid fibers blue-red tints of good fastness to light and sublimation.

Example 5

17.1 parts of 1-amino-benzene-4-methyl-sulfone, 25 parts of a 4 N-solution of sodium nitrite and 30 parts of ice in 40 parts of water are mixed with 25 parts of concentrated hydrochloric acid. The clear golden yellow diazo-solution is run slowly into 23.1 parts of N-ethyl-N-β-cyanethylamino-3-acetylaminobenzene in 40 parts of 2 N-hydrochloric acid. By the addition of a solution of sodiumacetate the dyestuff is precipitated, and it dyes cellulose acetate, nylon, cellulose triacetate and polyethylene terephthalate yellow-orange tints.

Example 6

20.5 parts of 1-amino-2-chlorobenzene-4-methyl-sulfone are diazotized and coupled with 23.1 parts of N-ethyl-N-β-cyanethyl-amino-3-acetylamino-benzene in the manner described in Example 2. The resulting orange dyestuff dyes the aforesaid fibers fast to light and sublimation. Further dyestuffs, which dye the aforesaid fibers the tints given in column III of the following table, are obtained by diazotizing the diazo-components given in column I, in the manner described in the preceding examples, and coupled with the coupling components given in column II.

| | I. Diazo-component | II. Coupling-component | III. Tint |
|---|---|---|---|
| 1 | O₂N—⟨⟩—NH₂ | ⟨⟩—N(C₂H₅)(C₂H₄CN), NH–COOC₂H₅ | scarlet |
| 2 | O₂N—⟨⟩(Cl)—NH₂ | ⟨⟩—N(C₂H₅)(C₂H₄CN), NH–COOC₂H₅ | red |
| 3 | O₂N—⟨⟩(CN)—NH₂ | ⟨⟩—N(C₂H₅)(C₂H₄CN), NH–COOC₂H₅ | blue-red |

| | I. Diazo-component | II. Coupling-component | III. Tint |
|---|---|---|---|
| 4 | CH₃O₂S—⟨C₆H₃(Cl)⟩—NH₂ | ⟨C₆H₄⟩—N(C₂H₅)(C₂H₄CN), NH—COOC₂H₅ | orange. |
| 5 | CH₃O₂S—⟨C₆H₄⟩—NH₂ | ⟨C₆H₄⟩—N(CH₃)(C₂H₄CN), NHCOCH₃ | yellow-orange. |
| 6 | O₂N—⟨C₆H₄⟩—NH₂ | ⟨C₆H₄⟩—N(C₂H₅)(C₂H₄CN), NH—CO—CH₂—CH₂—CH₃ | scarlet. |
| 7 | O₂N—⟨C₆H₃(Cl)⟩—NH₂ | ⟨C₆H₄⟩—N(C₂H₅)(C₂H₄CN), NH—CO—CH₂—CH₂—CH₃ | red. |
| 8 | O₂N—⟨C₆H₃(CN)⟩—NH₂ | ⟨C₆H₄⟩—N(C₂H₅)(C₂H₄CN), NH—CO—CH₂—CH₂—CH₃ | violet-red. |
| 9 | CH₃O₂S—⟨C₆H₄⟩—NH₂ | ⟨C₆H₄⟩—N(C₂H₅)(C₂H₄CN), NH—CO—CH₂—CH₂—CH₃ | yellow-orange. |
| 10 | CH₃O₂S—⟨C₆H₃(Cl)⟩—NH₂ | ⟨C₆H₄⟩—N(C₂H₅)(C₂H₄CN), NH—CO—CH₂—CH₂—CH₃ | orange. |
| 11 | O₂N—⟨C₆H₄⟩—NH₂ | ⟨C₆H₄⟩—N(CH₂CH₂OH)(CH₂CH₂CN), NHCOCH₃ | red. |
| 12 | O₂N—⟨C₆H₃(Cl)⟩—NH₂ | ⟨C₆H₄⟩—N(CH₂CH₂OH)(CH₂CH₂CN), NHCOCH₃ | dark red. |

| | I. Diazo-component | II. Coupling-component | III. Tint |
|---|---|---|---|
| 13 | $O_2N-\phenyl(Cl)-NH_2$ | $\phenyl(NHCOCH_3)-N(CH_2CH_2OH)(CH_2CH_2CN)$ | claret red. |
| 14 | $CH_3O_2S-\phenyl-NH_2$ | $\phenyl(NHCOCH_3)-N(CH_2CH_2OH)(CH_2CH_2CN)$ | orange. |
| 15 | $CH_3O_2S-\phenyl(Cl)-NH_2$ | $\phenyl(NHCOCH_3)-N(CH_2CH_2OH)(CH_2CH_2CN)$ | orange-red. |

*Example 7*

1 gram of the dyestuff obtained as described in the first two paragraphs of Example 1 is pasted with 1.5 grams of sulfite cellulose waste liquor or dinaphthyl-methane disulfonic acid or a fatty alcohol, ethylene oxide condensation product, the paste is diluted with water to 4000 cc., and there are added, per liter, 1 cc. of acetic acid of 40% strength and 1 gram of a fatty alcohol-ethyleneoxide condensation product. 100 grams of a yarn of polyester fibers are dyed in the resulting dyebath for half to 1 hour at 115 to 132° C., whereby a deep red dyeing of very good fastness to light and sublimation is obtained.

What is claimed is:

1. Monoazo-dyestuffs of the formula

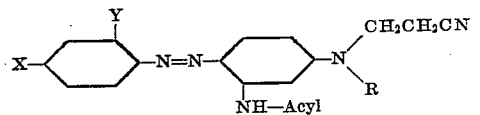

wherein X represents a member selected from the group consisting of nitro, cyano and methylsulfonyl, Y is a member selected from the group consisting of hydrogen, chlorine, bromine, cyano and methylsulfonyl, R represents an alkyl group containing at most 4 carbon atoms and "Acyl" represents an aliphatic acyl group containing at most 4 carbon atoms.

2. Monoazo-dyestuffs which correspond to the formula

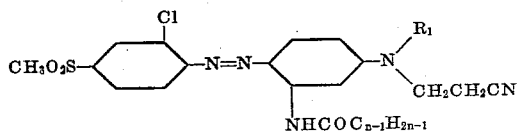

wherein $R_1$ represents an alkyl group having at most 2 carbon atoms and $n$ represents a whole number of at most 4.

3. The monoazo-dyestuff of the formula

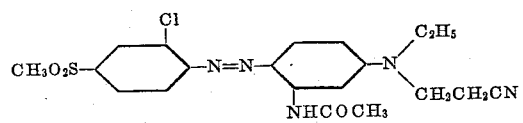

4. The monoazo-dyestuff of the formula

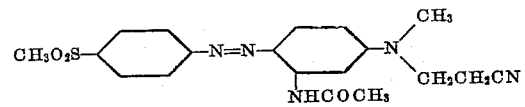

5. The monoazo-dyestuff of the formula

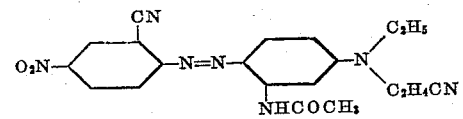

6. The monoazo-dyestuff of the formula

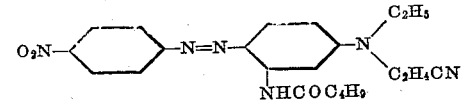

References Cited in the file of this patent

UNITED STATES PATENTS

| 2,111,300 | Senn | Mar. 15, 1938 |
| 2,173,417 | Huber | Sept. 19, 1939 |
| 2,492,971 | Dickey | Jan. 3, 1950 |
| 2,782,186 | Merian | Feb. 19, 1957 |
| 2,830,043 | Merian | Apr. 8, 1958 |
| 2,891,942 | Merian | Jan. 23, 1959 |